United States Patent [19]

Stratienko

[11] 4,089,398

[45] May 16, 1978

[54] AUTOMATIC RELEASING LOCK

[75] Inventor: Andrew Stratienko, Philadelphia, Pa.

[73] Assignee: Dresser Industries, Inc., Dallas, Tex.

[21] Appl. No.: 784,390

[22] Filed: Apr. 4, 1977

[51] Int. Cl.² ............................................. F16D 13/60
[52] U.S. Cl. .................................. 192/114 R; 74/625
[58] Field of Search ....................... 192/114 R; 74/625

[56] References Cited

U.S. PATENT DOCUMENTS

| 3,198,033 | 8/1965 | Fry | 192/114 R X |
| 3,466,945 | 9/1969 | McNeal, Jr. | 74/625 |
| 4,022,309 | 5/1977 | Denkowski et al. | 192/114 R X |

Primary Examiner—Roy Lake
Assistant Examiner—DeWalden W. Jones
Attorney, Agent, or Firm—John M. Lorenzen

[57] ABSTRACT

An automatically releasing lock system is disclosed for use on a motor having an output shaft with a resiliently biased sliding engagement member on the shaft, biased toward engagement with a driven shaft. The system utilizes a locking recess formmed in the engagement member with cam surfaces formed therein, and detent rods resiliently biased into engagement in the engagement member recess.

6 Claims, 11 Drawing Figures

AUTOMATIC RELEASING LOCK

BACKGROUND OF THE INVENTION

In a large number of manufacturing processes utilized in industries such as petrochemicals and food processing, the move toward automation has resulted in the necessity for applying motorized power sources to the components of those manufacturing processes. One of the largest and most critically needed areas of motorized operation is in the opening and closing of valves such as gate valves, butterfly valves, plug valves, and ball valves.

The prior art has provided motorized valve operators which primarily utilize electric motors operating through worm gear assemblies with gear reduction to move the gate valve stem vertically and rotate the valve stems of butterfly and plug valves. The prior art motorized valves have been further automated by the provision of torque sensitive cut-off and reversing switches to shut the actuator motor off before the valve is properly closed. In addition to the automatic operation, a back-up system of manual operation must be provided for the situation where a power loss or motor failure has occurred.

The disadvantages suffered by the prior art valve actuators arise in the structure of the two above-mentioned features, the torque cut-off switch and the manual operation feature. The prior art devices utilize a type of torque sensing system such as a coil spring or Belleville springs interconnected with the worm gear assembly such that when the gate valve is closed and resistance to further movement begins to increase drastically, the spring system is compressed to a point that a switch is actuated. This cuts power to the actuator motor and the motor slows and stops.

The problem that arises with this type of system is that a correct calculation of the closing torque that will be obtained is not possible with any degree of accuracy because of the high rotational inertia in the motor after electric power is shut off. Thus, the only method of getting the proper closing torque is through a trial and error process on each individual motorized operator because of the large number of variables involved, such as motor size, motor speed, total rotational momentum, required seating torque, gear reduction ratio, stem speed, gear masses, and others. As a consequence of this inaccuracy, severe damage can occur to the valve components from inadvertent over-tightening.

A second disadvantage suffered by prior art devices involves the provision for switching the actuator from automatic to manual operation. These devices provide a separate lever and gear assembly in the actuator. This elaborate system begins with an external shifting lever and includes several shafts and sliding gears for shifting the mode of operation. Unfortunately, the mere inertia and complexity of this system may prevent its successful operation when it is needed the most. A small amount of dirt, sludge, or corrosion can render the shifting mechanism inoperable and the valve will not be operable until either the motorized operation is restored or the actuator can be disassembled and repaired. Also, the nature of the manual lever system requires that the actuator be placed in an easily accessible location.

The present invention overcomes these serious disadvantages and other disadvantages of the prior art by providing a motorized valve actuator utilizing electrical and mechanical simultaneous motor disengagement and automatic switching from motor operation to manual operation and back again.

DESCRIPTION OF THE PREFERRED EMBODIMENTS

Figure 1A:
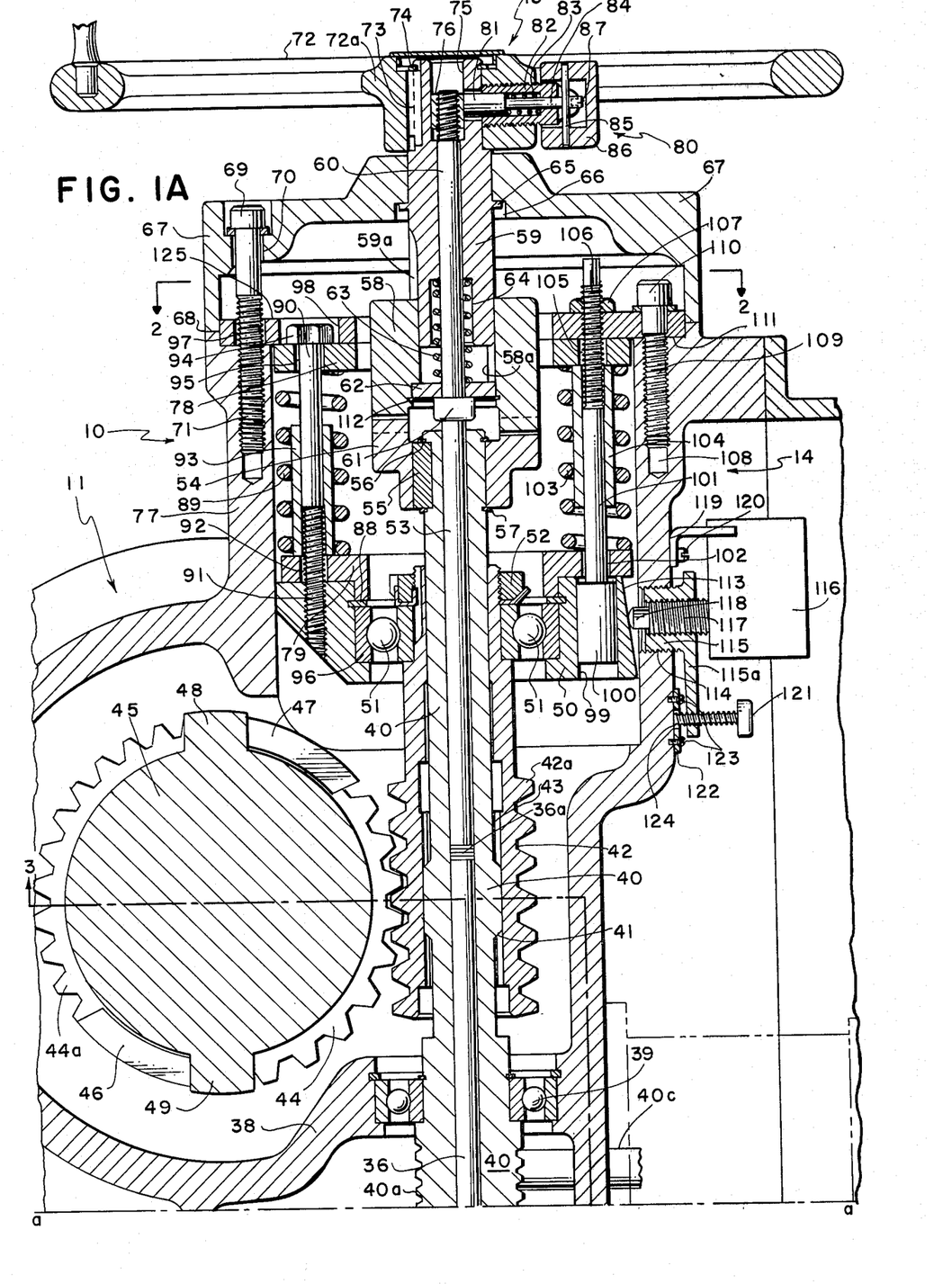
FIGS. 1A and 1B illustrate a cross-sectional view of a first embodiment of the invention.
Figure 1B:
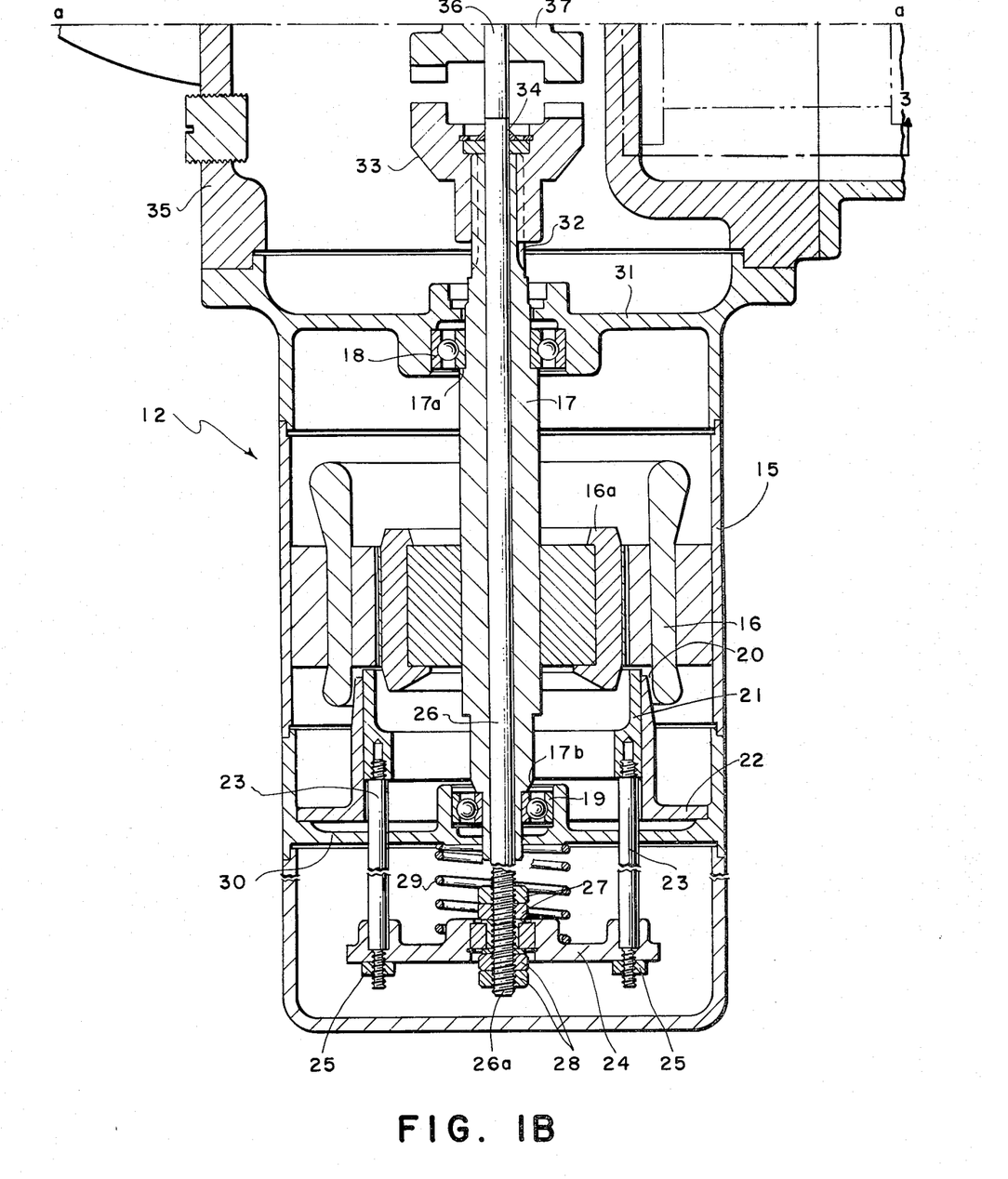

Referring now to FIGS. 1A and 1B, which when connected at common break line a—a form a cross-sectional illustration of the valve actuator mechanism 10. The actuator mechanism 10 has a stem assembly 11, a motor section 12, a hand wheel assembly 13 and a spring cartridge assembly 14.

The electric motor assembly 12 has an outer housing 15 and a motor stator assembly 16. The stator assembly 16 is mounted in housing 15, and a rotor assembly 16a is mounted on a rotatable shaft 17 which is carried by upper roller bearing 18 and lower roller bearing 19. The stator 16 encloses an annular space 20, and in close proximity thereto is located a sliding sleeve 21 mounted in a stationary electromagnetic shield sleeve 22. The sliding sleeve 21 is of a magnetic substance such as iron or steel and has threaded therein a plurality of elongated stud members 23.

At the opposite ends of studs 23 is a stud plate 24 securely attached to the studs by threaded locknuts 25. A first section of spreading rod 26 having a threaded end 26a extends through hollow shaft member 17 and stud plate 24 and is tightly secured to plate 24 by a pair of locking nut sets 27 and 28. A helical coil spring 29 abuts stud plate 24 and an internal web surface 30 of housing 15. The action of coil spring 29 is to continuously bias stud plate 24 downward thereby maintaining sliding rod 26 in its lowermost position.

At the upper end of housing 15 is an internal wall section 31 which provides support for bearing 18 and through which projects the upper end of shaft 17. The projecting end of shaft 17 has a splined section 32 formed thereon and on which is slidingly located a jaw clutch member 33. Jaw clutch 33 is securely attached to spreading rod 26 by means such as welding 34.

Sliding movement of the motor shaft 17 is prevented by abutment of shoulder 17a with the inner race of bearing 18. Likewise, a shoulder 17b prevents movement of shaft 17 in the opposite direction by abutment with the inner race of bearing 19. Spreading rod section 26 may slide coaxially inside shaft 17.

The motor housing 15 is attached by means such as bolts to an actuator gear housing 35 containing a second spreading rod 36 which is in coaxially aligned abutment with lower rod section 26. Rod section 36 passes through a jaw clutch 37 held in web plate 38 in rotatable relationship therein by a ball bearing assembly 39. The jaw clutch sleeve 37 has an upwardly extending shaft section 40 having a worm section which comprises a continuous helical tooth 40a formed on the outer surface thereof. A position switch gear shaft 40c extends behind worm section 40a and has secured thereon in engagement with worm 40a a position switch worm gear 40b (see FIG. 4A). Rotation of shaft 40 rotates gear 40b and shaft 40c which are operably connected to a position-limit switch (not shown), which switches are known in the art. This switch governs valve travel in the opening and closing directions and regulates the position indicator lights. When a position-seated valve such as a butterfly or plug valve is being operated, rather than a torque-seated valve such as a gate valve, the position-limit switch is advantageous for shutting off the motor and reversing the direction of travel. Basically, the position-limiting switch tracks the number of rotations of the shaft 40 and its direction of rotation to monitor valve position.

Above worm 40a, shaft 40 has short external splines 41 formed thereon. A helical worm 42 having internal splines 43 is slidably located on the splined portion of shaft section 40. Worm 42 has a continuous helical tooth 42a located externally thereon. Worm 42 is in engagement with a cylindrical, driven, worm gear sleeve 44 which is located in sliding relationship around a stem 45. Driven worm gear sleeve 44 has a plurality of longitudinal gear teeth 44a formed on the external surface thereof and a pair of upwardly extending lugs 46 and 47 extending upward past the ends of teeth 44a. The lugs are arranged to contact a pair of abutment lugs 48 and 49 formed on stem 45.

The upper end of worm 42 extends into a spring cartridge base 50 and has located thereon a ball bearing assembly 51 secured by a threaded nut 52. Bearing assembly 51 allows rotation of sleeve 42 within base member 50. The upper extended portion of shaft 40 passes slidably through the sleeve of worm 42 and extends upward in housing 35. A third spreading rod 53 extends through the center of hollow member 40 protruding slightly past the upper end thereof. A jaw clutch 54 is secured on the end of shaft 40 by means such as a spline or keyway 55. The jaw clutch is retained by snap rings 56 and 57.

A mating jaw clutch 58 is arranged in slidably abutting relationship with clutch 54 such that engagement of the two clutch members can be accomplished. Clutch member 58 is slidably and coaxially located on a splined shaft 59 and a fourth spreading rod 60 passes through the center of hollow shaft 59 extending into abutting relationship with rod 53. Rod 60 has an enlarged head section 61 at the lower end for abutment with rod 53. A retention washer 62 is located above head 61 and in abutment therewith for preventing rod 60 from sliding upward and out of shaft 59.

A helical coil spring 63 is located in compression inside a hollow recess 64 in shaft 59. Spring 63 provides a continual biasing action against shaft 59, pushing retainer 62 downward against head 61 and tending to maintain rod 60 in its lowermost position. A raised annular shoulder 65 is formed externally on shaft 59 and seats in a recess 66 formed in the upper housing 67 to restrain shaft 59 from upward passage therethrough.

Actuator gear housing 35 has an upwardly extending spring cartridge housing 77 formed integrally therewith. This housing is joined at 68 to the upper wheel housing 67. Upper housing 67 is secured to spring cartridge housing 77 by a number of threaded bolts 69 passing through openings 70 and threadedly engaging housing 77 in threads 71.

A manual operating wheel 72 is attached to shaft 59 and prevented from rotating thereon by key means 73 fitting in corresponding grooves formed in shaft 59 and the internal surface of wheel hub 72a. A snap retainer ring 74 prevents wheel 72 from sliding off of shaft 59. The upper end of shaft 59 extends through the hub 72a of wheel 72 almost flush with the upper surface thereof. Shaft 59 has an enlarged opening 75 formed at the upper end for receiving the upper end of rod 60 which contains a nut 76 threaded thereon.

A spring loaded lockout mechanism 80 is provided with the manual wheel assembly and consists of a sliding lock member 81 located in hub 72 passing through an opening in the upper end of shaft 59 and arranged to be projected inward below nut 76 to prevent further downward movement of rod 60. An intermediate threaded sleeve 82 is threaded into hub 72a and contains a helical spring 82 compressed therein. Locking pin 81 is in abutment with spring 83 and has a reduced diameter pin shaft 84 extending outward through threaded sleeve 82. A crossbar 85 is secured in narrow pin shaft 84 and has a thumb cap 86 located thereon. The intermediate sleeve 82 has a transverse groove 87 which allows the pin assembly to be secured in its outward, nonlocking, retained position by pulling cap 86 to the right and rotating 90° to seat crossbar 85 in groove 87. To return to locking action, crossbar 85, pin 81, and shaft 84 are released from groove 87 and allowed to slide radially inward, whereupon it will automatically move into a locking position below nut 76 when the nut has moved upward sufficiently to pass above locking pin 81. FIG. 1A shows the mechanism in its automatic locking setting. The locking mechanism may be neutralized by pulling outward on cap 86, rotating 90° and reseating locking bar 85 in groove 87.

A pair of spring compression plates 78 and 79 are located inside cartridge housing 77. Lower plate 79 is slidably located above cartridge base 50 on top of circular snap ring 88. Two sets of helical compression springs each comprising three equispaced coil springs are located between plates 78 and 79. The first set of springs 89 are located around bolts 90 in encircling relationship therewith. Each bolt 90 is located inside an enlarged bolt head opening 98 located in upper cartridge plate 125. Bolt 90 passes through a bolt passage 95 in the spring compression plate 78 and extends downward inside coil spring 89 and bolt liner 93. The threaded end 91 of bolt 90 is threadedly engaged in spring cartridge base 50. Bolt 90 passes through bolt passage 92 in the lower compression plate 79.

A second set of three helical coil compression springs 103 is also located in compression between upper and lower compression plates 78 and 79 equispaced between each of the coil springs 89. A spring stud 101 passes coaxially through each coil spring 103 and is threadedly engaged at 106 in upper plate 125. A locknut 107 further secures stud 101 against movement with respect to plate 125. Stud 101 extends downward through a stud passage 105 formed in upper compression plate 78, through the spring guide 104, through a stud passage 102 formed in lower compression plate 79 and into a cylindrical opening 99 formed in base 50. An enlarged cylindrical piston section 100 is formed on the lower end of stud 101 for sliding engagement in cylinder 99. Passage 102 is insufficient to allow movement therethrough by piston 100. The construction of each bolt and spring assembly of the three member set is identical to that illustrated at 89 and 90. Likewise, the assembly of each stud and spring assembly in the three member set is identical to that disclosed at 101 and 103.

Upper plate 125 is tightly secured to the upper portion of cartridge housing 77 by a plurality of bolts 109 passing through plate 125 and threadedly engaging in bore 108. The bolts 109 have enlarged heads 110 for abutment with washers or directly with plate 125. An inwardly projecting annular shoulder 111 is formed inside on the wall of housing 77 for receiving plate 125 in abutment therewith.

Figure 2:
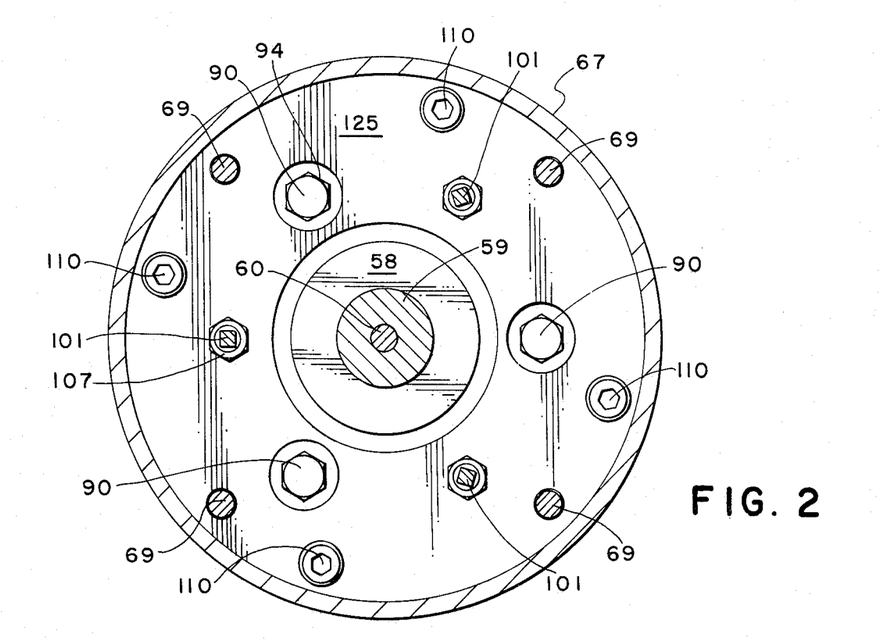
FIG. 2 is a partial cross-sectional axial view taken at line 2—2 of FIG. 1A.

Referring now to FIG. 2, an axial cross-sectional view of the arrangement of bolts and studs described above in the cartridge housing is illustrated. Each of the bolts and studs 90 and 101 are located in an alternating circular pattern as shown. The four bolts 69 securing the upper housing 67 to the cartridge housing 77 are shown in cross-section. The four bolts 110 securing the upper plate 125 to the annular shoulder 111 are shown spaced from bolts 69.

Figure 3:
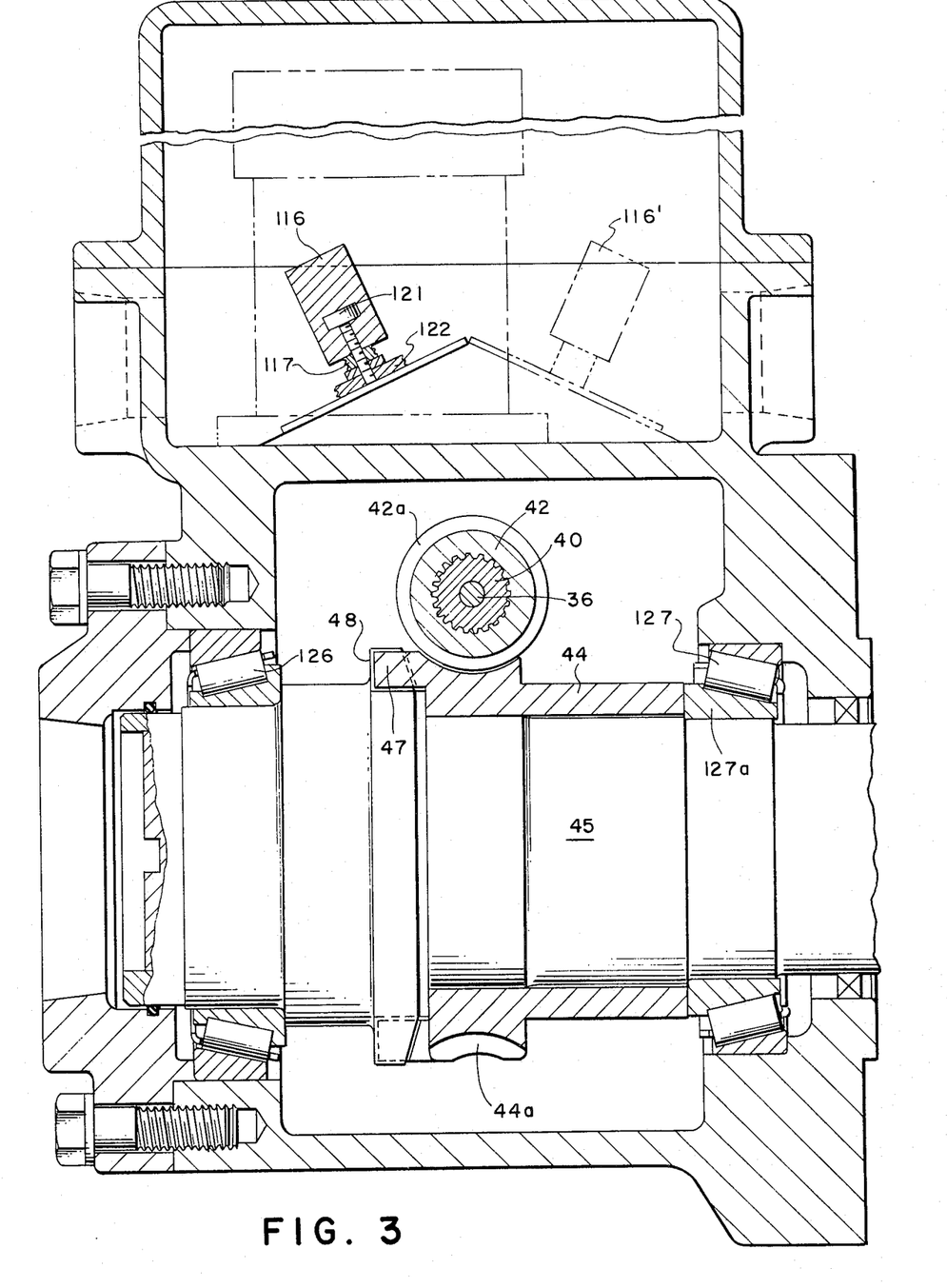
FIG. 3 is an axial cross-sectional view taken at line 3—3 of FIGS. 1A and 1B.

FIG. 3 illustrates a partial cross-sectional view of the assembly taken at line 3—3 of FIGS. 1A and 1B. In FIG. 3 spreading rod 36, splined section 40 and worm 42 are shown in axial cross-section. Also illustrated are the driven gear sleeve 44 with gear teeth 44a surrounding valve stem 45. Stem 45 is mounted in roller bearings 126 and sleeve 44 is located in axial abutment with the inner race 127a of roller assembly 127.

Also in FIG. 3, microswitch 116 is shown and a second microswitch assembly 116' is drawn-in in phantom. Each microswitch assembly is arranged to provide a sensing and switching function in one direction of movement of the spring cartridge assembly. Thus, switch 116 is in operating engagement with wedge surface 113 and the second switch 116' will be contacted with a second wedge surface having a surface tapered in the opposite direction to surface 113.

Figure 4A:
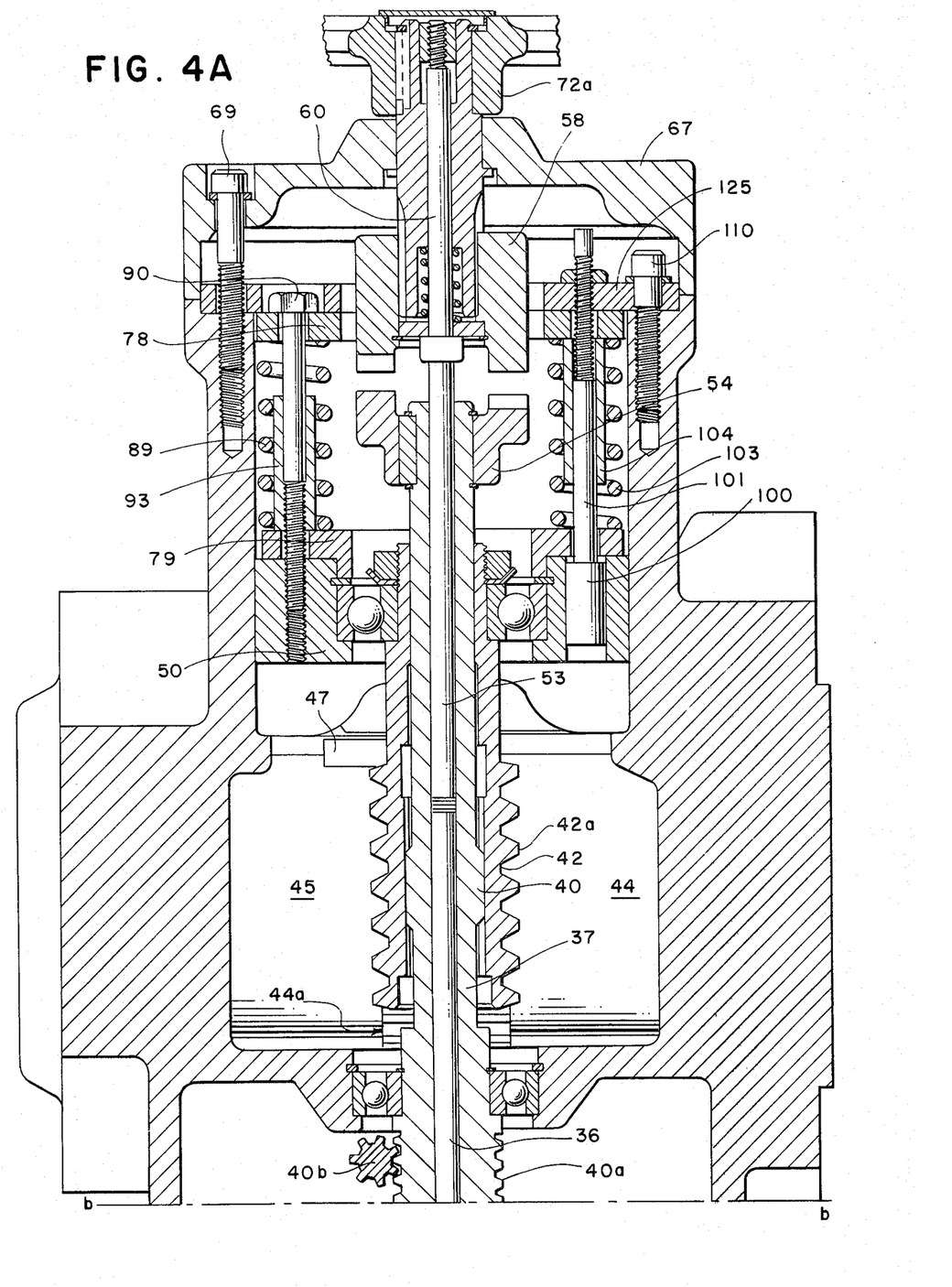
FIGS. 4A and 4B illustrate a partial cross-sectional view of the invention of FIGS. 1A and 1B rotated approximately 90° therefrom.
Figure 4B:
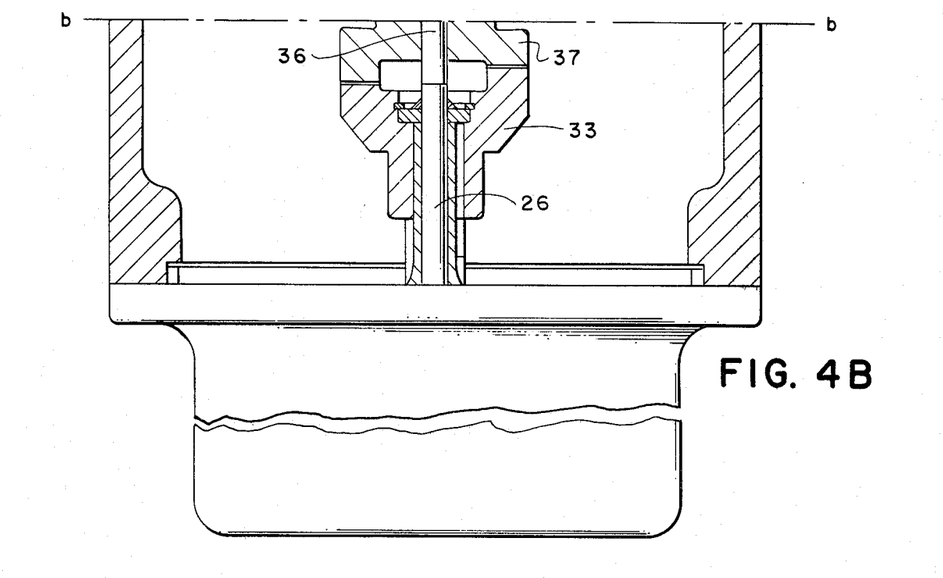

FIGS. 4A and 4B, when joined at common line b—b, comprise a cross-sectional illustration of the invention of FIGS. 1A and 1B at a 90° orientation therefrom. The Figure further illustrates the relation between the valve stem 45, gear sleeve 44 and gear ring 44a. In this Figure, similar numbers indicate similar structure with respect to FIGS. 1A through 3.

In typical operation, the valve actuator mechanism 10 is energized by supplying an electric power source to the motor 12. As this power source energizes motor 12 an electromagnetic field is generated around the stator. This strong magnetic field draws sleeve 21 into space 20 and into contact with the stator. This in turn moves stud members 23 and stud plate 24 upward simultaneously therewith. This movement of plate 24 slides spreading rods 26, 36, 53, and 60 upward. This serves to move jaw clutch 33 into engagement with clutch 37 while simultaneously pushing jaw clutch 58 out of engagement from jaw clutch 54. This spacing of the two pairs of clutches is such that clutches 58 and 54 will be completely disengaged before clutches 33 and 37 begin engagement.

Likewise, with this shifting movement of the spreading rods, the rotational force imparted by the motor assembly 12 is transferred to shaft 17 which in turn moves through splines 32, the jaw clutch 33. Since clutches 33 and 37 are engaged, clutch 37 and the upward extending shaft 40, which is an integral part thereof, also begin to rotate. The rotation of shaft 40 operates through splines 41 and 43 to rotate worm 42. This in turn drives the driven gear ring 44 until the lugs 46 and 47 impact the valve stem lugs 48 and 49 thereby imparting a sufficient hammer force to the stem to begin movement of it in case it has become stuck or frozen by corrosion or sediment.

The motor will continue to rotate the valve stem 45 through the aforementioned clutch and gearing system until that point when the valve stem has reached the end of the desired travel. At this point, the valve stem will begin to tighten at a sharp rate and resistance to further rotation will increase to the point that further rotation of shaft 37 will force the worm 42 to slide upward along shaft 40.

This movement will be transferred through the bearing assembly 51 and into base 50 and spring compression plate 79. Movement upward of these elements will serve to compress the six helical springs 89 and 103. This compression will occur against upper plate 78. Bolts 90 will move freely upward through opening 89 and studs 101 will remain stationary as the lower section 100 thereof will be allowed to slide in opening 99 as base section 50 moves upward thereby. Movement upward by plate 78 is prevented by abutment with upper plate 125 which is securely held against shoulder 111 by bolts 109.

It should be noted that, as previously mentioned, clutches 58 and 54 are completely disengaged before any engagement of clutch 33 and 37 are achieved. This serves to disengage the manual valve opening mechanism consisting of the hand wheel 72 and a splined shaft 59 which is continuously engaged in clutch 58. Upward movement of the four spreading rods serves to push the retention washer 62 upward by means of abutment with head 61. The snap ring 112 and the recessed shoulder above washer 62 in clutch 58 serve to retain the washer tightly in the central opening of clutch 58. Thus, when head 61 is pushed upward by rod 53 this moves clutch 58 upward through abutment with washer 62.

Clutch 58 is provided with internal splines 58a which mate with external splines 59a on spline shaft 59. This splined arrangement allows sliding movement of clutch 58 on shaft 59 but locks them together against any rotational movement therebetween.

Upon reaching the proper seating or opening torque, the wedge surface 113 will have moved under the contact button 118 a sufficient amount to compress it into housing 117 thereby actuating a microswitch located at 116. This is connected with the power source to motor assembly 12 and, upon compression of button 118 a predetermined distance by surface 113, power will be disconnected from the electric motor. When this occurs, the magnetic field in the stator assembly will dissipate instantaneously and sleeve 21 will no longer be held therein. Springs 29 will thus be able to force plate 24 back downward which in turn pulls spreading rod 26 downward and simultaneously disengages clutch 33 from clutch 37.

The rotational inertia remaining in the heavy motor assembly will thus be allowed to dissipate in a free wheeling manner and will not react on the gear assembly to further increase the tightening torque on the valve stem. This instantaneous mechanical disconnect of the motor thus allows the person operating the valving system to carefully present the desired seating torque without having to account for the additional torque added by the rotational inertia of the driving motor.

When the actuator has moved the valve stem to the end of its travel, for example, when closing the valve, and the switch system 116 has disconnected the motor, both mechanically and electrically, a second circuit may be provided in switch 116 to reverse the direction of rotation of the electric motor for the next power cycle. Thus, when the operating personnel wish to open the valve again, the power is merely reconnected to the electric motor and the valve will be actuated in the opposite direction. Alternately, a switching circuit may be provided having markings thereon related to opening or closing, thus allowing operating personnel to select the direction of travel for the valve.

In any case, upon disconnection of the motor from the actuating gears and clutches, the manual operating system is automatically reengaged in the actuating system. This occurs through the spring action of coil spring 63 which expands against washer 62 and slides clutch 58 back downward into engagement with clutch 54. Thus, should the power fail or the motor become inoperable, it will automatically disconnect the actuating mechanism from the motor drive end of the assembly and engage the hand operated mechanism at the opposite end of the assembly.

The hand wheel 72 may be locked out of operation through the activation of the lockout arrangement 81. The cap 86 is rotated until the crossbar 85 is in the position shown in FIG. 1A, thus allowing spring 83 to move member 81 radially inward against nut 76. When power is applied to motor assembly 12, the action of the spreading rods upward will slide nut 76 above member 81 allowing it to move in further against rod 60 below nut 76. Thus, the manual operating wheel will be locked out regardless of whether the electrical drive system is operable or not. The manual system may be reengaged any time the power is off by pulling outward on cap 86 and rotating it 90° to seat crossbar 85 in the upper groove 87. This maintains member 81 in a position clear of nut 76.

When the valve actuating mechanism is reversed to move the valve stem in the opposite direction as mentioned above by either of the alternate methods, the electric power will be restored to the motor 12 which will then be rotating in the opposite direction from that previously described. The magnetic field will again be instantaneously generated around stator 16 and in space 20 which will pull sleeve 21 against the stator, moving the spreading rods upward, disengaging clutches 58 and 54, and shortly thereafter reengaging clutch 37 with clutch 33. The rotational force of the motor will then be imparted to the worm 42 which will in turn drive gear 44. Lugs 47 will rotate until they contact stem lugs 49 and impart an initial hammer blow to free the stem if stuck or frozen. Movement of the valve stem will then commence. The motor will drive through the gearing assembly until the valve stem reaches the end of its travel whereupon gear ring 44 will slow and eventually stop, thereby causing worm 42 to advance downward pulling its associated interconnected assemblies with it.

Thus, downward movement of sleeve 42 acting through nut 52 moves bearing assembly 51 and base plate 50 downward therewith. The lower compression plate 79 is held against downward movement by its abutment with piston ends 100 on studs 101. Studs 101 are prevented from downward movement by their threaded engagement with plate 125 and by the presence of locknuts 107. Downward movement of cartridge base 50 also causes downward movement of upper plate 78 through the action of bolts 90 which are threaded into plate 50 and in abutment with upper plate 78. Thus, since lower plate 79 is refrained from moving downward but upper plate 78 is brought down by the action of bolts 90, a compression of the six helical springs 89 and 103 between the two compression plates is achieved. The compression of the six springs tends to absorb shock from the bearing components and from the valve stem reaching its end of travel. The springs also tend to retard the downward movement of sleeve 42.

Upon reaching a certain amount of downward movement, the cammed surface having an opposite slope to that of surface 113 engages the complimentary microswitch 116' which is similar in operation to switch 116 except it operates for movement of the valve actuator in the opposite direction. When the cartridge assembly has moved downward sufficiently to activate switch 116', power to the motor assembly 12 will be disconnected and the magnetic field generated therein will simultaneously be dissipated allowing spring 29 to move plate 24 downward, disengaging clutches 33 and 37 and reengaging the manual actuating mechanism as previously described.

Adjustment of the closing or opening torque desired may be obtained to a fine degree by the adjustment of switches 116 and 116'. This adjustment is provided by rotating threaded sleeve 115 having internal and external threads thereon. Rotation of switch box 116 is prevented by the securing arrangement 119 and 120. Rotation of housing 117 is prevented by being securedly attached to switch housing 116. A radial rotation arm 115a is formed on sleeve 115 so that sleeve 115 may be rotated clockwise or counterclockwise to move housing 117 and contact button 118 inward or outward with respect to wedge surface 113. A threaded lock screw 121 is engaged in the outer radial end of arm 115a and a flat circular calibration ring 122 is provided around the periphery of the arc created by rotation of arm 115a and sleeve 115. A number of setting holes 124 are drilled in the flat calibration ring 122 which allow screw 121 to be threaded thereinto to lock sleeve 115 in the desired position. The torque settings associated with each position 124 may be enscribed on ring 122 which settings may be calculated or determined by experimental methods. Likewise, a similar structure is provided for switch assembly 116' for operation of the valve stem in the opposite direction.

The advantages of the above described embodiment are numerous and are obvious in light of the description thereof. One of the main advantages is the elimination of a complex parallel gearing and lever system for disengaging the electric motor and engaging the manual hand wheel. In the present invention, the hand wheel and the motorized system are in the same coaxial gear train. Likewise, no manual changeover from the motor to the hand wheel is required. When power is lost or motor failure occurs, the motor is automatically disconnected and the hand wheel is automatically engaged. Thus, the elimination of the separate shifting mechanism found in the prior devices.

A second major advantage obvious in the invention is the elimination of the valve overtightening which occurs in the prior art devices from the dissipation of the rotational inertia of the drive motor. The prior art devices utilize electric disconnect of the motor but dissipate the rotational energy in the tightening operation. The present invention provides a simultaneous electric and mechanical disconnection of the motor to prevent any of the rotational inertia of the motor from entering the tightening sequence after the preselected torque has been achieved. This results in the ability to obtain a very accurate and precise torque in the closing and opening of the valve.

A third advantage apparent in this invention is found in the spreading rod principle which is a fail-safe design arranged to prevent simultaneous engagement of the actuator motor and the manual operation system. The total combined length of the spreading rods is just sufficient to prevent simultaneous engagement of clutches 33 and 37 and clutches 58 and 84.

Likewise, a feature is provided with this invention whereby the manual operating system may be placed on automatic lockout for lockout at any time power is restored to the motor. The disengagement of the hand wheel will activate the lockout pin and the hand wheel will not be reengageable until the lockout has been manually reset to allow hand wheel operation.

Another advantage of this invention is the provision of a multitude of coil springs 89 and 103 to replace the fatigue-prone Belleville spring systems of the prior art devices. The multitude of helical springs also is advantageous over those prior art devices which utilize a single large coil spring which itself is subject to failure. The provision of a number of springs allows operation of the assembly even though one or more of the springs may have failed.

The present invention also allows the retention of the conventional worm gear operation on the valve stem which is a gear reducing mechanism and which also is a self locking gearing system preventing loosening or backing off of the valve after it has moved into the opening or closed position.

One further advantage of the present invention is the ease with which the spring cartridge assembly may be removed for repair or replacement with springs of different spring force constants. The spring cartridge assembly may be removed by disassembling the bolts 69, 90 and 110.

Figure 5A:
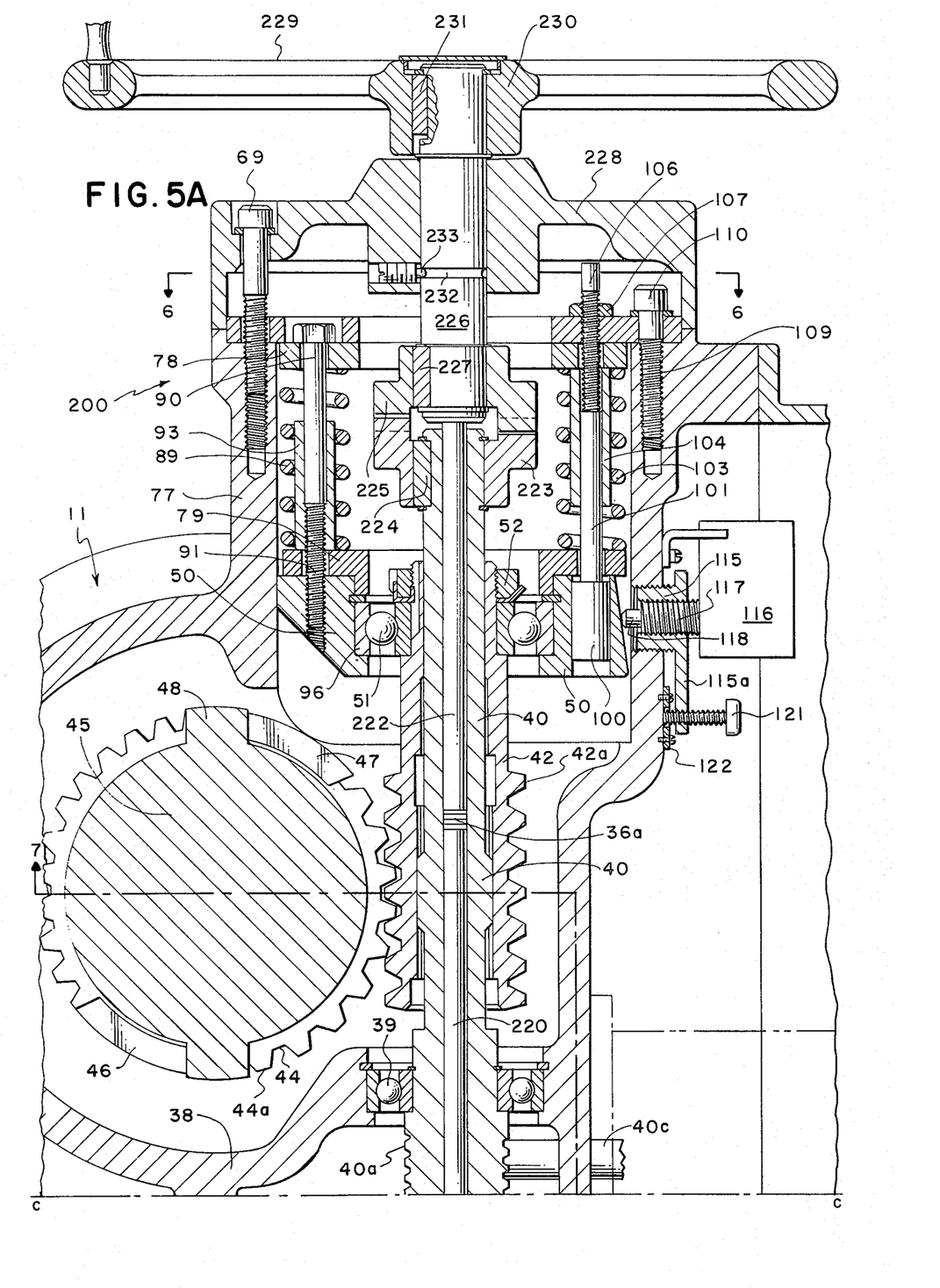
FIGS. 5A and 5B illustrate a cross-sectional view of a second embodiment of the invention.

Referring now to FIGS. 5A through 7B, an alternate embodiment of the invention is disclosed. FIGS. 5A and 5B, when joined at common break line c—c, illustrate a cross-sectional view of a valve actuator mechanism 200 which does not utilize the automatic switching feature from motorized operation to manual operation on power loss or motor failure. The actuating mechanism 200 instead utilizes a switching feature that is hand-engaged rather than automatically engaged as in mechanism 10. In mechanism 200, many of the same components are utilized from the actuator 10 and these components are numbered identically to the corresponding components in FIGS. 1A through 4B.

Figure 5B:
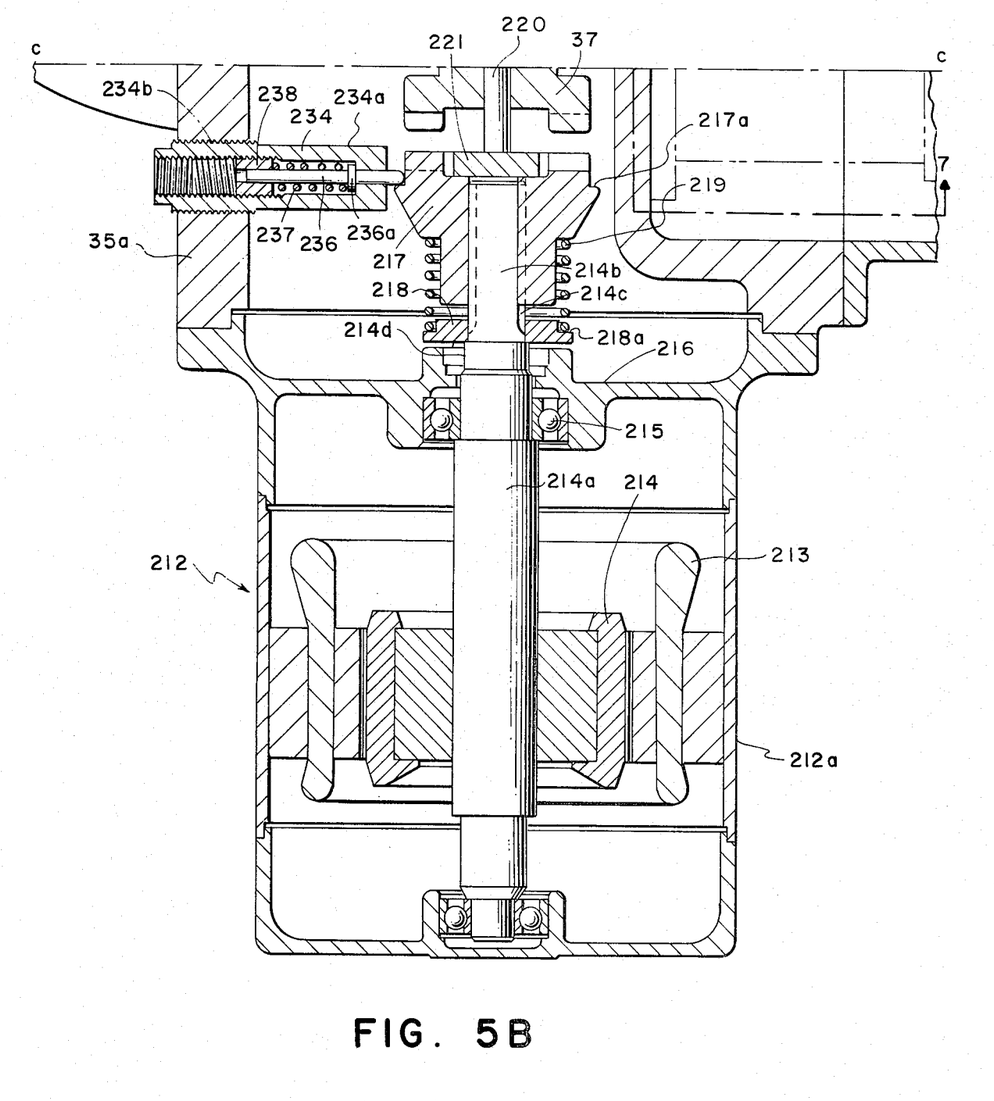
Figure 6:
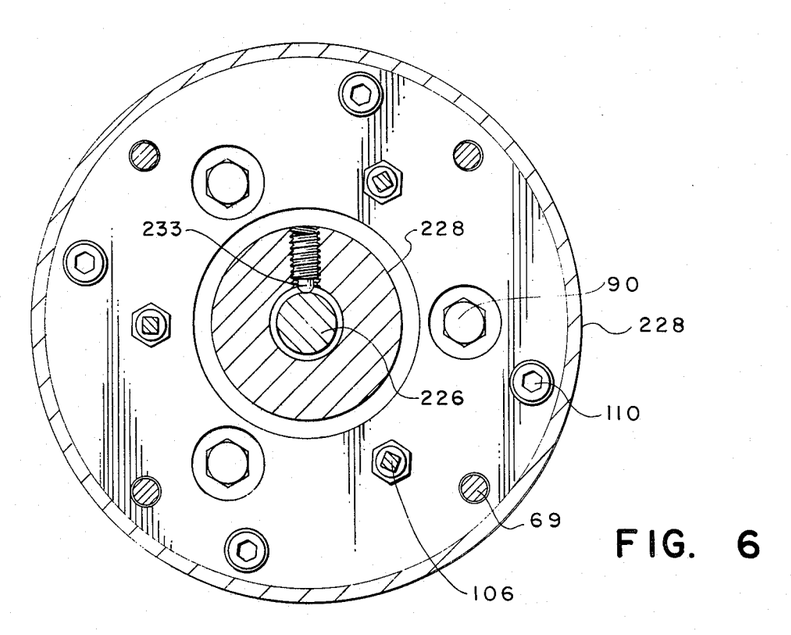
FIG. 6 is a partial axial view of the second embodiment taken at line 6—6 in FIG. 5A.

In this invention, a standard electric motor 212 is utilized which does not feature the magnetic engagement operation as utilized in the first embodiment. The motor 212 has a stator assembly 213 secured inside the motor housing 212a. A rotor assembly 214 is secured on a rotating shaft 214a which is supported by ball bearings 215 set in web structure 216. The upper end 214b of shaft 214a has external splines 214c located thereon which are engaged in the internal splines of jaw clutch 217. A raised shoulder section 214d is formed on shaft 214a below spline section 214c. This shoulder receives a retention disc 218 having a stepped outer perimeter 218a. A coil spring 219 encircles the lower end of jaw clutch 217 and engages in the stepped perimeter 218a of disc 218. Spring 219 is in compression and tends to bias jaw clutch 217 to slide upward on splines 214c.

A mating jaw clutch 37 is located above clutch 217 in a position to be engaged therewith. Clutch 37 has an upper extending hollow shaft section 40 as described in the previous embodiment. A lower spreading rod 220 is located in the central passage of clutch 37 and extends downwardly therefrom to an enlarged abutment disc 221 formed at the lower end of rod 220. Clutch 37 is rotatably secured in web plate 38 by ball bearing assembly 39.

The valve stem 45 and the driven worm gear ring 44 having lugs 47 thereon are similar in construction to the corresponding elements of the previous embodiment. A position-limit switch (not shown) is connected via shaft 40c and worm gear 40b (not shown) to a limit switch worm section 40a formed on shaft 40 as described in the previous embodiment. Operation of this switch is also the same as in the first embodiment. Likewise, spline section 40 and worm 42 are similarly constructed.

A number of flat spacer discs 36a are located on top of rod 220 and carry a second rod 222. Rod 222 extends upward above the upper end of shaft 40. A jaw clutch 223 is securedly held on shaft 40 by means such as snap rings. A keyway 224 locks jaw clutch on shaft 40 against rotation thereon. A mating jaw clutch 225 is located directly above clutch 223 and is similarly secured to the hand wheel shaft 226 by keyway 227 and upper and lower snap rings.

Hand wheel shaft 226 is slidably and rotatably mounted in upper housing 228. A manual hand wheel 229 having a reenforced hub section 230 is secured on the upper end of shaft 226 by snap rings and rotation thereon is prevented by a keyway 231. A peripheral groove 232 is formed in shaft 226 for receiving a spring loaded detent button 233. A pair of microswitches 116 and 116' for sensing the opening and closing torque in the valve stem are provided as described in the previous embodiment.

A pair of locking plungers 234 and 235 are located in threaded openings in the wall 35a of the actuator housing. Each locking plunger is located radially outward from jaw clutch 217. Jaw clutch 217 has formed in the outer wall hereof a stepped perimeter section 217a. Each locking plunger utilizes a generally cylindrical housing 234a with a threaded section 234b. The plunger body is hollow and contains a plunger rod 236 which has an abutment shoulder 236a thereon for preventing the rod from sliding out of the end of housing 234a. A coil spring 237 is located in compression behind shoulder 236a and in abutment with threaded plug 238 which is threaded into section 234b of the plunger housing. Plug 238 has a bore passage therethrough for slidably engaging rod 236.

Figure 7A:
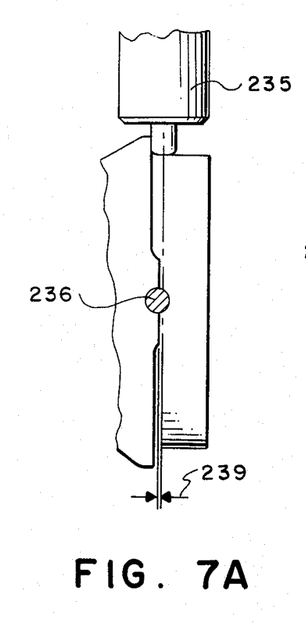
FIGS. 7A and 7B are detailed views of the tripping mechanism of FIG. 5B at line 7—7.
Figure 7B:
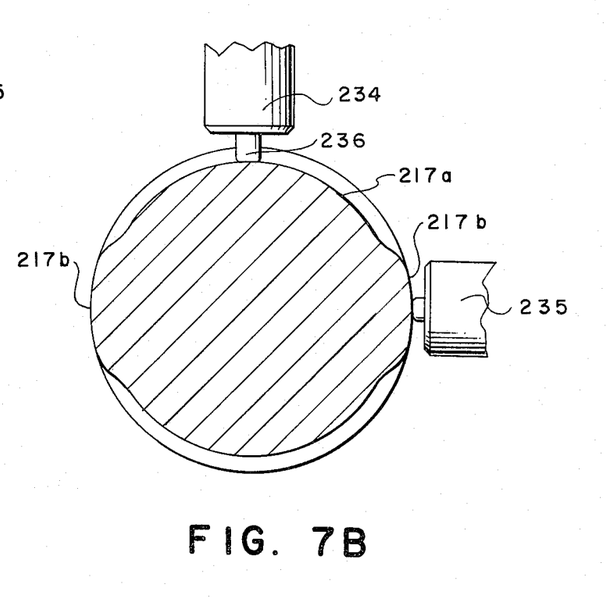

FIGS. 7A and 7B more particularly illustrate the structure of the two locking plungers 234 and 235. FIG. 7B is a cross-sectional view of jaw clutch 217 illustrating the peripheral step section 217a. It can be seen that stepped section 217a contains a pair of diametrically opposed cammed shoulders 217b having an outer diameter identical to the outermost diameter of jaw clutch 217. Thus, when jaw clutch 217 is pushed downward against spring 219, at least one of the locking plungers 234 or 235 will engage in stepped shoulder 217a thereby locking jaw clutch 217 in its disengaged downward position.

In FIG. 7A the means for disengaging the locking plungers is illustrated. This consists of a small offset 239 between the plunger rods of the two locking plungers 234 and 235. This offset occurs in the axial direction corresponding to the longitudinal axis of shaft 214 and rod 220. Thus, after the jaw clutch 217 has been manually disconnected from clutch 37 by moving it backwards until locking plungers 234 or 235 engage shoulder 217a, jaw clutch 217 will remain locked down until power is restored to motor 212. Upon restoring power to the motor, jaw clutch 217 will begin to rotate with rotation of the motor. At this time, the plunger rod 236 of the left-most locking plunger 234 will be compressed by engaging one of the cam shoulders 217b. Upon reaching the outermost diameter on shoulder 217b, the locking action of plunger 234 will be neutralized and jaw clutch 217 will shift to the right by an amount equivalent to the offset 239. At this point, the jaw clutch will be engaged with locking plunger 235 and plunger 234 will no longer be able to reengage in stepped section 217a.

Upon an additional 90° rotation of jaw clutch 217, plunger 235 will engage a cammed shoulder 217b and will be compressed until it reaches the outermost periphery of a cammed shoulder, and the jaw clutch will be completely released to move upward and reengage clutch 37. The spring action of coil spring 219 automatically assures that this action will occur in all instances when the electric motor is restarted unless one of the operating personnel is still engaging the hand wheel and maintaining it pushed inward in the mechanism. The results of the hand wheel being engaged and power being supplied to the electric motor will still not create a dangerous situation since the length of spreading rods 220 and 222 has been adjusted precisely by the addition of spacer discs 36a to prevent simultaneous engagement of clutch 225 with 223 and clutch 37 with clutch 217.

The reengagement of power to motor 212 while the hand wheel is being held in place will merely allow the motor to rotate freely without engaging the actuating gear mechanism. When manual operation has been completed, releasing hand pressure on wheel 229 will allow spring 219 to move jaw clutch 217 against end 221 of spreading rod 220. This abutment will move rods 220 and 222 upward against shaft 226 tending to bias it outwards from housing 228. Spring detent button 33 will be compressed radially outward from groove 232 by this upward pressure and hand wheel 229 will be moved outward disengaging clutch 225 from clutch 223.

Any time power failure occurs or motor 212 quits running for any reason, the manual engagement may be accomplished merely by pushing downward on hand wheel 229 until detent button 233 engages groove 232 indicating by a snapping feel and sound that the manual system is engaged. This will press down on spreading rods 222 and 220 moving jaw clutch 217 downward on splines 214b until one or more of the locking plungers 234 engage shoulder 217a and lock jaw clutch 217 in its disengaged position. The hand wheel is then in a position through engagement of the upper jaw clutches to rotate worm sleeve 42 to drive valve stem 45 by means gear ring 44.

Operation of the torque control assembly comprising the six helical springs and their associated studs and bolts with switches 116 and 116' is identical to the operation of the identical components as described with respect to the first embodiment.

Thus, the advantages of the second embodiment include the elimination of the need for an independent gear and lever assembly for switching from manual to motorized operation. A second advantage lies in the spreading rod principle which prevents simultaneous engagement of the motorized gearing with the manual gearing.

This invention is particularly suited in nuclear plants and critical areas where speed of stem travel is very important. The use of this invention allows use of high speed motors to achieve a high stem speed for rapid valve operation.

Other advantages include those found in the previous embodiment such as easy removal of the spring cartridge assembly for maintenance or changing of spring constants. Likewise, this embodiment offers the advantage of precise control of predetermined valve seating torque.

Although certain preferred embodiments of the invention have been herein described in order to provide an understanding of the general principles of the invention, it will be appreciated that various changes and innovations can be effected in the described valve actuator mechanism without departing from these principles. For example, whereas six helical compression springs are utilized in the spring cartridge assembly, it is clear that other numbers and other types of springs might be utilized. Also, it is apparent that different types of sensing switches could be substituted for the spring button microswitches 116. Other changes would be apparent to one skilled in the art and therefore the invention is declared to cover all changes and modifications of the specific examples of the invention herein disclosed for purposes of illustration which do not constitute departures from the spirit and scope of the invention.

The embodiments of the invention in which an exclusive property or privilege is claimed are defined as follows:

1. In a drive system having a power shaft and a power transfer clutch slidably mounted on said power shaft; a locking system for locking said clutch in a retracted position on said shaft only while it is non-rotating, said locking system comprising:
   a peripheral locking recess formed on said power transfer clutch and having cam means formed therein;
   means continuously biasing said clutch toward a non-retracted position;
   a plurality of resiliently biased detent plungers arranged in a fixed radial position for engagement in said locking recess; and,
   said detent plungers being displaced axially from each other.

2. The locking system of claim 1 wherein said detent plungers are two in number, and said cam lobes having a different radial spacing than said two detent plungers.

3. In a power transfer system having a housing, a driving shaft, slidable transfer means on said shaft, and a driven shaft arranged to be operably connected by said transfer means to said driving shaft, the improvement comprising:
   a locking channel formed in the outer radial surface of said transfer means;
   raised shoulder means in said locking channel extending radially outward as far as the outer radial surface of said transfer means;
   resilient detent means in said housing and arranged to project radially inward therein, said detent means adapted to engage said locking channel; and, resilient biasing means on said driving shaft arranged to bias said transfer means into engagement with said driven shaft.

4. The power transfer system of claim 3 wherein said detent means comprises a detent housing having a slidable detent rod extending outward therefrom, and resilient means in said housing continuously biasing said rod outward therefrom.

5. The power transfer system of claim 3 wherein said detent means comprises a plurality of resiliently biased detent mechanisms spaced radially and axially apart from one another.

6. The power transfer system of claim 5 wherein said detent mechanisms number two, spaced approximately 90° apart radially; and said raised shoulder means number two, spaced approximately 180° apart, with a radial outer surface substantially flush with the radial outer surface of said transfer means.

* * * * *